US005346951A

United States Patent [19]
Suwada

[11] Patent Number: 5,346,951
[45] Date of Patent: Sep. 13, 1994

[54] RELEASING AGENTS AND RESIN COMPOSITIONS THEREWITH

[75] Inventor: Ataru Suwada, Kyoto, Japan

[73] Assignee: Sanyo Chemical Industries, Ltd., Kyoto, Japan

[21] Appl. No.: 91,255

[22] Filed: Jul. 15, 1993

[30] Foreign Application Priority Data

Jul. 17, 1992 [JP] Japan .................................. 4-213494

[51] Int. Cl.⁵ ............................................. C08G 63/48
[52] U.S. Cl. ..................................................... 525/64
[58] Field of Search ........................................ 525/64

[56] References Cited

U.S. PATENT DOCUMENTS 4,732,924 3/1988 Terada et al. ........................... 525/64
4,739,001 4/1988 Okamoto et al. ....................... 525/64
4,917,982 4/1990 Tomono et al. .

FOREIGN PATENT DOCUMENTS 62-265670 11/1987 Japan .
63-282751 11/1988 Japan .
2234602A 6/1991 United Kingdom .

OTHER PUBLICATIONS

Hawley's Condensed Chemical Dictionary, 12 edition, Van Nostrand Reinhold Co. N.Y., pp. 938, 851 and 852.

*Primary Examiner*—Melvyn I. Marquis
*Attorney, Agent, or Firm*—Oblon, Spivak, McClelland, Maier & Neustadt

[57] ABSTRACT

The present invention provides a releasing agent obtained by reacting of an organic polysiloxane having a hydroxyl group or an epoxy group with an ethylenically unsaturated dicarboxylic acid grafted polyolefin or a reaction product of said grafted polyolefin and an active hydrogen atom-containing compound selected from the group consisting of an alcohol, an amine and an aminoalcohol.

This releasing agent can be used in a resin composition for use in electrophotographic toner.

23 Claims, No Drawings

RELEASING AGENTS AND RESIN COMPOSITIONS THEREWITH

BACKGROUND OF THE INVENTION

Field of the Invention

The present invention relates to a releasing agent and a resin composition therewith suitable for use in an electrophotographic toner. More particularly, it relates to a releasing agent and a resin composition therewith which provides a negative charge to an electrophotographic toner.

Description of the Prior Art

Releasing agents are useful in electrophotographic or electrostatic recording systems. JP B 3304/1977 discloses a releasing agent composed of a low molecular weight polypropylene. However, toners containing releasing agents composed of conventional low molecular weight polyolefins have high melting (or softening) temperatures and therefore necessitate high temperatures during the fixing process.

In order to obtain a toner useable in a fixing process at low temperature, JP A 282751/1985 discloses a releasing agent composed of an ethylenically unsaturated silane grafted wax. Alternatively, GB 2134602 discloses a releasing agent composed of a polyolefin modified with an organic silane compound having an amino group. Both releasing agents are used in toners with positive charge.

Attempts to modify low molecular weight polypropylene to obtain a releasing agent with a lower melting temperature have provided toner compositions with poor flowability. Incorporation of natural waxes or synthetic waxes with low melting points such as polyethylene wax or unsaturated carboxylic acid modified waxes into toner compositions results in a decrease in the releasing property or flowability of the toner and often causes the toner particles to cohere. Ethylenically unsaturated silane grafted polyethylene waxes are also not suitable as releasing agents in toners with negative charge, because a relatively great amount of a charge control agent is needed.

Furthermore, some conventional releasing agents have poor compatibility with binder resins and/or charge control agents and when combined in toner compositions result in toner particles which have an inferiorly dispersed state. This phenomena decreases the stability and performance of the toners.

SUMMARY OF THE INVENTION

Accordingly, one object of the present invention is to provide a releasing agent for use in a toner which can be fixed at a lower temperature than conventional releasing agents. Another object of the present is to provide a releasing agent for use in a toner which has improved hot-offsetting properties. A further object of the present invention is to provide a releasing agent for use in a toner which melts or softens at a lower temperature than conventional releasing agents and which does not impede the flowability of the toner. A further object of the present invention is to provide a releasing agent compatible with binder resins or charge control agents. A further object of the present invention is to provide a releasing agent which can be easily and minutely dispersed in a polyester resin. A further object of the present invention is to provide a releasing agent for use in a toner with negative chargeability. Moreover, a further object of the present invention is to provide a binder resin composition for use in a toner containing a releasing agent with a low fixing temperature, good anti-hot offsetting properties, negative chargeability and good releasing properties.

The present inventors have now found that these objects can be surprisingly realized with a releasing agent obtained by reacting of an organic polysiloxane having a hydroxyl group or an epoxy group with an ethylenically unsaturated dicarboxylic acid grafted polyolefin or a reaction product of said grafted polyolefin and an active hydrogen atom-containing compound selected from the group consisting of an alcohol, an amine and an aminoalcohol.

DETAILED DESCRIPTION OF THE INVENTION

The term "polyolefin" as used herein means a polyolefin or copolymer of an olefin and a monomer copolymerizable therewith.

Suitable polyolefins according to the present invention include polyethylene of high density, medium density or low density types; ethylene copolymers such as ethylene-α-olefin copolymers, ethylene-vinyl acetate copolymers, ethylene-methacrylic acid copolymers and ethylene-acrylic acid copolymers; polypropylene; propylene copolymers such as propylene-α-olefin copolymers, propylene-vinyl acetate copolymers, propylene-methacrylic acid copolymers and propylene-acrylic acid copolymers; polybutene; poly-4-methylpentene-1 and combinations thereof.

Suitable polyolefins according to the present invention have a number average molecular weight of from 500 to 100,000, preferably 1,000 to 20,000. Preferably, the polyolefin is a low molecular weight polyolefin obtained by thermal degradation of a high molecular weight polyolefin. A low molecular weight polyethylene with a number average molecular weight of 1,000 to 20,000 is particularly preferred to produce a releasing agent with a low fixing temperature.

Suitable ethylenically unsaturated dicarboxylic acids according to the present invention include maleic acid, fumaric acid, itaconic acid, citraconic acid and anhydrides thereof. Among these, maleic anhydride is preferred. Suitable ester, amide and imide derivatives of the aforementioned dicarboxylic acids include, for example, methyl maleate, dibutyl maleate, maleic acid monoamide and maleimide.

The amount of dicarboxylic acid which is suitably added to the polyolefin is 0.5 to 30% by weight, preferably 1 to 20% by weight, based on the weight of the resultant modified polyolefin.

Suitable alcohols according to the present invention include monohydric alcohols such as methanol, ethanol propanol, butanol, pentanol, hexanol, octanol, oleyl alcohol and stearyl alcohol and polyhydric alcohols such as ethylene glycol, diethylene glycol, 1,4-butanediol, bis-hydroxyethoxy-benzene, glycerin and pentaerythritol.

Suitable amines according to the present invention have 1 to 18 carbon atoms and include monoamines such as dimethylamine, diethylamine, propylamine, laurylamine and stearylamine; diamines such as ethylenediamine, 1,4-butylenediamine, cyclohexanediamine, tolylenediamine and isophoronediamine and triamines such as diethylenetriamine.

Suitable aminoalcohols according to the present invention include monoethanolamine, diethanolamine, N-methylethanolamine, N,N-dimethylethanolamine, N,N-diethylethanolamine and N,N-dimethylpropanolamine.

Ethylenically unsaturated dicarboxylic acid grafted polyolefins according to the present invention can be suitably obtained by graft reacting one of the aforementioned polyolefins with one of the aforementioned dicarboxylic acids in a solution or melted state at 120° to 180° C. for 0.5 to 10 hours, in the presence of an organic peroxide, if needed.

The grafted polyolefin can alternatively be obtained by reacting one of the aforementioned polyolefins with an ester, amide or imide of one of the aforementioned dicarboxylic acids in a solution or melted state at 120° to 180° C. for 0.5 to 10 hours, in the presence of an organic peroxide, if needed, followed by hydrolysis of the obtained reaction product.

Suitable reaction products of a grafted polyolefin and an active hydrogen atom-containing compound according to the present invention can be obtained by reacting 0.1 to 3 moles, preferably 0.4 to 2.2 moles, of an active hydrogen atom-containing compound per one mole of the aforementioned dicarboxylic acid grafted polyolefin at 60° to 240° C. for 0.5 to 20 hours, in the presence of a catalyst and a solvent if needed. When an excess amount of the active hydrogen atom-containing compound is employed, the unreacted compound is preferably removed from the resultant product by reduced pressure or solvent extraction. Suitable catalysts useful in the above reaction include oxides, hydroxides, or carbonates of metals and tertiary amines. Suitable solvents useful in the above reaction are not particularly limited and include, for example inert aromatic solvents such as xylene, toluene and benzene.

The reaction product of a grafted polyolefin and an active hydrogen atom-containing compound can alternatively be obtained by an ester exchange reaction between one of the aforementioned grafted polyolefins and an ester of one of the aforementioned alcohols instead of the alcohol. In this case, the active hydrogen atom-containing compound includes a masked compound which has the same reaction behavior toward a carboxylic acid as an alcohol or amine such as an ester, an amide or an imide.

According to the present invention, the active hydrogen atom-containing compound preferably reacts with less than or equal to 50% of the carboxylic groups in the ethylenically unsaturated dicarboxylic acid grafted polyolefin.

Suitable polysiloxanes according to the present invention may be oily or resinous and are of the following formulae:

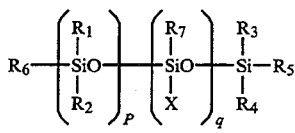

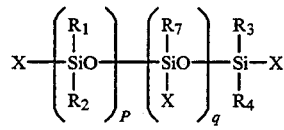

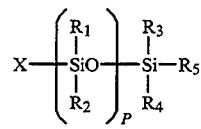

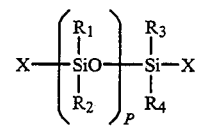

wherein:
each of $R_1$ to $R_7$ is independently the same or different and is a monovalent group such as methyl, propyl, dodecyl, phenyl, $\beta$-phenylethyl or 3,3,3-trifluoropropyl, X is a monovalent group including an epoxy group such as glycidyl, glycidyloxyalkyl or 3,4-oxocyclohexylalkyl or a hydroxyl group such as hydroxypropyl, hydroxyisobutyl, hydroxyphenethyl, hydroxyethylpolyoxyethylenealkyl or hydroxypropylpolyoxypropylenealkyl, and P and q are each independently 0 or an integer greater than 1, provided that the sum of P and q is an integer of from 10 to 1,000.

Suitable polysiloxanes according to the present invention include polydimethylsiloxane comethylhydroxyethoxypropylsiloxane, polydimethylsiloxane comethylgycidyloxypropylsiloxane and polydimethylsiloxane comethyl-3,4-oxocyclohexylethylsiloxane.

Suitable polysiloxanes having hydroxyl groups are commercially available under the tradenames of "X-22-160AS" (hydroxyl value: 112), "KF-6001" (hydroxyl value: 62), "KF-6002" (hydroxyl value: 35), "KF-6003" (hydroxyl value: 96), "KF851", "X-22-801", available from Shinstsu Kagaku Kabushikikaisha, Japan and "F-235-21", "FZ-3722", "FZ-3711", "F-235-22", "F-235-71", "F-235-72", "F-235-73", "F-235-74", "F-235-75", "FZ-3748", "FZ-3749" available from Nihon Unicar Company, Japan.

Suitable polysiloxanes having epoxy groups are commercially available under the tradenames of "KF100T", "KF101" (epoxy equivalent: 340), "KF102" (epoxy equivalent: 4,000), "KF103", "X-60-164", "X-22-343", "X-22-367", "X-22-163AS", (epoxy equivalent: 490), "X-22-163A", (epoxy equivalent: 950), "X-22-163B", (epoxy equivalent: 1760), "X-22-163C", (epoxy equivalent: 2790), "X-22-163E", (epoxy equivalent: 4.000), "X-22-163F", (epoxy equivalent: 6,100), "X-22-169A" (epoxy equivalent: 980), "X-22-169B", (epoxy equivalent: 1,670), available from Shinetsu Kagaku Kabushikikaisha, Japan and "L-9300", "FZ-3720", "F-217-31", "F-217-32", "F-239-41", "F-239-42", "F-239-43", "F-217-41", "F-217-42", "FZ-3736", "F-239-51", "F-239-52", "F-239-53" available from Nihon Unicar Company, Japan. Preferably, a polysiloxane with an epoxy equivalent of 200 to 10,000 is used.

The releasing agent of the present invention is suitably produced by reacting the ethylenically unsaturated dicarboxylic acid grafted polyolefin with the polysiloxane containing hydroxyl or epoxy groups, or alternatively by reacting the reaction product of the grafted polyolefin and the active hydrogen atom-containing compound with the polysiloxane containing hydroxyl or epoxy groups such that the ratio of carboxylic groups to hydroxyl or epoxy groups is 0.5 to 2 equivalents at a temperature of from 80° to 260° C. for 0.5 to 16 hours, in the presence of a catalyst if needed.

Suitable releasing agents according to the present invention contain 0.01 to 5% by weight of silicon atoms. When the releasing agent contains less than 0.01% by weight of silicon atoms, it imparts an insufficient electrostatic charge to the toner. When the releasing agent contains more than 5% by weight of silicon atoms, the releasing agent is difficult to produce and has an insufficiently improved anti-hot offsetting property.

Particularly preferred releasing agents are obtained by reacting a maleic anhydride graft onto polyolefin produced by thermal degradation which has a number average molecular weight of 1,000 to 20,000 with monohydric alcohol groups with 1 to 18 carbon atoms and subsequently reacting the resultant half ester with a polysiloxane having an epoxy equivalent of from 200 to 10,000.

Suitable binder resins according to the present invention include polyolefin, polyurethane, polyamide, poly(-vinyl butyral), rosin, terpene resin, phenolic resin, petroleum resin, homo- or co-polymers of styrenic monomer, polymer of acrylate ester, polyester resin and epoxy resin.

Suitable polyolefins useful as binder resins include polyethylene, poly(vinyl acetate) and poly(vinyl chloride). Suitable homopolymers of styrenic monomer include polystyrene and polyvinyltoluene. Suitable copolymers of styrenic monomer include styrene-substituted styrene copolymers such as styrene-p-chlorostyrene, styrene-vinyltoluene and styrene-ethylenically unsaturated ester copolymers such as styrene-methyl acrylate, styrene-ethyl acrylate, styrene-butyl acrylate, styrene-octyl acrylate, styrene-butyl methacrylate, styrene-maleate ester or styrene-fumarate ester copolymers and styrene-diene copolymers such as styrene-butadiene copolymer. Suitable copolymers of styrenic monomer may further include a cross-linked copolymer comprising one of the above monomers and a cross-linkable monomer.

Suitable polyester resin useful as resin binders can be linear or non-linear. Suitable polyester resin include polyester resins comprising a polyhydric alcohol such as ethylene glycol, diethylene glycol, butanediol, neopentyl glycol, p-xylylene glycol, cyclohexanediol, cyclohexanedimethanol, glycerin, pentaerythrytol or an alkylene oxide (for example, ethyleneoxide or propyleneoxide) adduct of bisphenol A or phenolic resin having a nucleus number of 3 to 20 and a polycarboxylic acid such as fumaric acid, maleic acid, succinic acid, adipic acid, suberic acid, azeraic acid, sebacic acid, terephthalic acid, isophthalic acid, 2,6-naphthalene-dicarboxylic acid, trimellitic acid, pyromellitic acid, hemimellitic acid, trimesic acid or 4-neopentylidenyl-1,2,6,7-heptanetetracarboxylic acid.

Homo- or copolymer of styrenic monomer and polyester resin are preferably used as the resin binder. Preferred polymer compositions include a polymer of a vinyl monomer selected from the group consisting of an acrylate ester, a methacrylate ester, styrene, fumarate mono- or diester, acrylonitrile, methacrylic acid and methacrylamide, said polymer having a number average molecular weight of 2,000 to 15,000, a Z average molecular weight of at least 400,000 and a ratio of Z average molecular weight to number average molecular weight of 50 to 600; a polyester resin comprising a polycarboxylic acid and an alkylene oxide adduct of a phenolic resin; and a polyester resin comprising a polycarboxylic acid comprising trimellitic acid and an alkylene oxide adduct of bisphenol A.

The above vinyl polymer having the Z average molecular weight of at least 400,000 can be obtained by polymerizing the above monomer in the presence or absence of monoperoxide as a polymerization initiator at relatively low temperature and then further continuing to polymerize the monomer with the use of the solvent and the above initiator. Preferably the bulk polymerization is conducted until 30 to 90% by weight, based on the total weight of the monomer, of the monomer is consumed. The preferred reaction temperature is of from 80° to 150° C.

Suitable vinyl polymer can alternately be obtained by polymerizing the aforementioned monomer at higher temperature in the presence of a poly-peroxide instead of the monoperoxide. When a poly-peroxide is used, polymerization can occur by bulk polymerization, solution polymerization, dispersion polymerization or emulsion polymerization. When a poly-peroxide is used, a vinyl polymer with the aforementioned molecular weights can be produced with shorter processing time.

Suitable poly-peroxides according to the present invention include 1,1-di-t-butylperoxy-3,3,5-trimethylcyclohexane, 1,3-bis-(t-butylperoxyisopropyl) benzene, 2,5-dimethyl-2,5-di-(t-butylperoxy) hexane, 2,5-dimethyl-2,5-di-(t-butylperoxy) hexyne-3, tris-(t-butylperoxy) triazine, 1,1-di-t-butylperoxycyclohexane, 2,2-di-t-butylperoxy butane, n-butyl 4,4-di-t-butylperoxyvalerate, di-t-butylperoxy hexahydrotorephthalate, di-t-butylperoxy azerate, di-t-butylperoxytrimethyl adipate, 2,2-bis-(4,4-di-t-butylperoxycyclohexyl) propane and 2,2-di-t-butylperoxy octane.

Among these, 1,1-di-t-butylperoxy-3,3,5-trimethylcyclohexane, 1,1-di-t-butylperoxycyclohexane, di-t-butylperoxy hexahydroterephthalate, di-t-butylperoxy azerate and 2,2-bis-(4,4-di-t-butylperoxycyclohexyl) propane are preferred.

The resin composition of the present invention can be obtained by dissolving or dispersing 0.5 to 30% by weight, based on the total weight of the resin composition, preferably 0.5 to 10% by weight, more preferably 1 to 5% by weight, of the releasing agent of the present invention in 70 to 99.5% by weight, based on the total weight of the resin composition, preferably 90 to 99.5% by weight, more preferably 95 to 99% by weight, of a binder resin which is in solution and subsequently removing the solvent or by mixing both components in their melted states.

The resin composition can alternatively be obtained by an addition polymerization of the above vinyl monomer, or condensation polymerization of a combination of the polyhydric alcohol and the polycarboxylic acid previously mentioned, in the presence of the releasing agent of the present invention. In the above condensation polymerization, a lower alkyl ester of the polycarboxylic acid is more preferred than the acid.

A toner or developer suitable for electrophotography can be prepared by kneading the resin composition of the present invention with a coloring agent, a charge control agent and a magnetic powder or a carrier particle if needed, pulverizing these auxiliaries until their desired particle size distribution is attained and mixing the resultant powder with hydrophobic colloidal silica powder.

Suitable coloring agents are not particularly limited and include, for example, carbon, iron black, benzidine yellow, quinacridone, Rhodamine D and phthalocyanines.

Suitable charge control agents are not particularly limited and include, for example, Bontron E-82, Bontron S-34 (available from Orient company, Japan) and Spiron Black TRH (available from Hodogaya Kagaku Company, Japan).

Suitable magnetic powders are not particularly limited and include, for example, powders of iron, cobalt, nickel or magnetite and ferrite.

Suitable carrier particles are not particularly limited and are, for example, glass beads.

Having generally described this invention, a further understanding can be obtained by reference to certain specific examples which are provided herein for purposes of illustration only and are not intended to be limiting unless otherwise specified. The parts and percentages, unless otherwise indicated are all by weight.

EXAMPLES

The following properties were determined:

1. Releasing property

The releasing properties of a developer comprising a releasing agent, a binder resin, a coloring agent, a charge control agent, a colloidal silica and a carrier were evaluated based on the anti-offsetting property and filming property of the developer.

2. Anti-hot offsetting property

An unfixed toner image was developed on plain paper using a commercially available duplicator (Model BD-7720, produced by Toshiba Corporation in Japan). The image on the paper was fixed at the speed of 35 copies of A4 sheet per minute using a commercially available duplicator (Model SF-8400A, produced by Sharp Corporation in Japan) equipped with a variable fixing device. In this way, the temperature of a heat roll necessary to initiate the off-setting phenomenon was measured.

3. Filming property

The filming property was evaluated by visually observing whether the toner was fused or smeared on a photosensitive drum after continuously producing 30,000 copies.

4. Flowability

Flowability was evaluated by determining the bulk specific gravity of a mixture of the resin composition containing the releasing agent and a carrier (Carrier F-150, available from Nihon Teppun Kabushikikaisha, Japan) using a powder tester available from Hosokawa Micron Kabushikikaisha, Japan. Higher the bulk specific gravities correlate with higher flowability.

7. Chargeability

The resin composition of the present invention and a carrier (Carrier F-150) in a 100 ml bottle were frictionized in a tumbler shaker mixer at a speed of 50 r.p.m. After a predetermined time, a charging quantity of the mixture was measured in an atmosphere of 23° C. and 50% relative humidity using a blow-off electrostatic charge meter available from Toshiba Corporation, Japan.

8. Melting point

The melting point of the releasing agent was measured using a melting point apparatus (Model RDC220, available from Seiko Denshikougyou Kabushikikaisha, Japan) by increasing the temperature in 10° C. increments per minute. A maximum peak on a chart was regarded as the melting point.

A developer was prepared by mixing 30 parts of a toner (comprising a releasing agent, a binder resin, a coloring agent, a charge control agent and a colloidal silica) and 720 parts of a ferrite carrier F-100 (available from Nihon Teppun Kabushikikaisha, Japan).

An unfixed toner image was visualized with the above developer on a plain paper using a commercially available duplicator (Model BD-7720, produced by Toshiba Corporation in Japan). The image on the paper was fixed at a delivery speed of 150 mm per second using a commercially available duplicator (Model SF-8400A, produced by Sharp Corporation, Japan) equipped with a variable fixing device. In this way, the minimum temperature to enable fixation was measured.

9. Preparation of binder resin

9-1. Preparation of high molecular weight polymer

A mixture of 480 parts styrene, 120 parts n-butyl acrylate, 0.1 parts 1,6-hexane diacrylate and 0.3 parts 2,2-bis-(4,4-di-t-butylperoxycyclohoxyl) propane was polymerized in a nitrogen atmosphere at 95° C. for 3 hours. Thereafter, 150 parts xylene were added and polymerized at 95° C. for an additional 4 hours and subsequently at 120° C. for 2 hours. After adding 0.6 parts of the peroxide to the resultant polymer, the polymerization was completed by increasing the temperature of the mixed solution to 160° C. over 2 hours and thereafter maintaining the temperature at 160° C. for one hour.

9-2. Preparation of low molecular weight polymer 300 parts xylene was fed into a 1 liter glass autoclave filled with nitrogen gas. The temperature of the solution was brought to 200° C. After dropping a mixture of 630 parts styrene, 73 parts n-butyl acrylate and 8 parts di-t-butylperoxide into the autoclave over 3 hours, polymerization was completed by heating the resultant solution at the same temperature. The resultant polymer had a number average molecular weight of 6,000 and a weight average molecular weight to a number average molecular weight ratio of 2.3. 91% of the resultant polymer units had molecular weights between 1,000 and 30,000 as determined by GPC analysis.

9-3. Preparation of binder resin composition

A binder resin composition was obtained by heating under reflux a mixture of 1,000 parts of the above high molecular weight polymer solution and 750 parts of the above low molecular weight polymer solution to homogeneity and subsequently distilling off the solvent under reduced pressure.

The composition had a weight average molecular weight of 300,000, weight average molecular weight/number average molecular weight ratio of 66, and a glass transition temperature of 59° C. Respective contents of the polymer of at least 300,000 and the polymer within the region between 1,000 and 30,000 in molecular weights occupied 28% and 47%, respectively, in area on a GPC chart. A molecular weight of 35,000 was located at the bottom and its height from the bass line occupied 13% of the height of top peak, on the GPC chart.

Example 1

900 parts of low molecular weight polypropylene having a number average molecular weight of 2,300 and a melt viscosity of 0.7 poise at 160° C. and 100 parts maleic anhydride were mixed and heated in 1,500 parts xylene to homogeneity. After adding 10 parts dicumyl peroxide to the resultant solution, the mixture was reacted at a temperature of 95° to 110° C. for 4 hours and then xylene was distilled off. Polypropylene maleated in amount of 5.0% by weight thus obtained has an acid value of 60. Nextly, 100 parts maleated polypropylene and 3 parts of a hydroxyl group-containing polysiloxane, KF151 (available from Shinetsu Kagaku Company, Japan) were mixed in 150 parts xylene and reacted at 140° C. for 2 hours. After distilling off xylene, a releasing agent was obtained which melted at 99° C.

Example 2

400 parts maleated polypropylene of Example 1 and 80 part lauryl alcohol were reacted in the presence of 1 part sodium hydroxide at 180° to 215° C. for 10 hours. The reaction product was obtained by distilling off both the xylene and the unreacted alcohol. The reaction product had an acid value of 22. The reaction product was then reacted with 16 parts of an epoxy group-containing polysiloxane, "KF101" (available from Shinetsu Kagaku Company, Japan) at 190° to 195° C. for 5 hours. The obtained releasing agent had an acid value of 9 and a melting point of 126° C.

Example 3

400 parts of a maleated product of thermal degraded polyethylene, "YOUMEX 2000" (available from Sanyo Chemical Industries, Ltd., in Japan) was reacted with 25 parts methanol at 95° to 110° C. in the presence of 1 part sodium hydroxide for 5 hours. After distilling off unreacted alcohol, a half ester having an acid number of 29 was obtained. This ester was reacted with an epoxy-group containing polysiloxane, "KF101" (epoxy equivalent: 340) at 170° to 190° C. for 6 hours. The releasing agent obtained had an acid number of 12 and a melting point of 100° C.

Example 4

A mixture of 400 parts of the maleated polyethylene of Example 3, 400 parts stearyl alcohol and one part sodium hydroxide was heated at 200° to 230° C. for 6 hours. After distilling off unreacted alcohol, the resultant reaction product was reacted with 16 parts of an epoxy group-containing polysiloxane, "KF102" (available from Shinetsu Kogaku Company, Japan) at 190° to 210° C. for 5 hours. The releasing agent obtained had an acid value of 5 and a melting point of 102° C.

Example 5

A solution of 400 parts of the maleated polyethylene of Example 3, 19 parts N,N-dimethylethanolamine in 600 parts xylene was heated at 190° to 210° C. for 4 hours. After distilling off unreacted alcohol and xylene, a product was obtained which had an amine value of 26. The product was further reacted with 12 parts of the aforementioned polysiloxane, KF101, at 190° to 210° C. for 5 hours. The releasing agent obtained had a melting point of 104° C.

Example 6

Eighty-seven parts of the binder resin composition previously mentioned was kneaded with 4 parts of the releasing agent of Example 1, 8 parts carbon black, "MA-100" (available from Mitsubishi Kasei Kougyou Kabushiki Kaisha, Japan) and one part of "SPIRON-BLACK TRH" (a charge control agent, available from Hodogaya Kagaku company, Japan) at 140° C. and 30 r.p.m. for 10 minutes in a "LABO-PLASTMILL" (available from Toyo Seiki Company, Japan).

The kneaded product was finely pulverized by means of a "JETMILL" (model PJM 100, available from Nihon Pneumatic Company, Japan) and sieved to set a fine powder with 2 microns or below by means of an airborne classifier (model NSD, available from Nihon Pneumatic Company, Japan). A toner was prepared by mixing one thousand parts of the obtained powder with 3 parts "AEROSIL R972" available from Nihon Aerosil Company, Japan). A developer was obtained by mixing 25 parts of the above toner with 1,000 parts of iron powder (produced under the trademark of "F-150" by Nihon Teppun company, Japan).

The anti-hot offsetting property and filming property of the developer obtained are as shown in Table 1.

Examples 7 to 10 and Comparative Example 1 to 3

Developers were prepared in the same manner as Example 6, with the exception that the releasing agent of Example 1 was replaced with each releasing agent of Examples 2 to 5 or commercially available paraffin wax, "VISCOL 550P" (low molecular weight polypropylene having a melting point of 140° C., available from Sanyo Chemical Industries, Ltd) or "SANWAX 151P" (low molecular weight polyethylene having a melting point of 103° C., available from Sanyo Chemical Industries, Ltd.)

The anti-offsetting property and filming property of these developers are as shown in Table 1.

TABLE 1

| Example | Anti-offsetting | Filming |
| --- | --- | --- |
| 6 | over 220° C. | not occurred |
| 7 | over 220° C. | not occurred |
| 8 | over 220° C. | not occurred |
| 9 | over 220° C. | not occurred |
| 10 | over 220° C. | not occurred |
| Comparative Example | | |
| 1 | 140° C. | greatly fused and smeared |
| 2 | 205° C. | fairly fused and smeared |
| 3 | 180° C. | greatly fused and smeared |

Examples 11 to 12 and Comparative Examples 4 to 5

One hundred parts of the binder resin composition previously mentioned was kneaded with 4 parts of the releasing agent of Examples 1 or 3, or of Comparative Examples 1 or 2 at 150° to 155° C. at the speed of 70 r.p.m. for 20 minutes by means of the Labo plastmill previously mentioned.

The resin composition of the present invention was prepared by finely pulverizing the kneaded product using the Jetmill previously mentioned and sieving the resultant powder to set a fine powder with 2 microns or below using the airborne classifier previously mentioned.

The bulk specific gravity of these powders is shown in Table 2.

TABLE 2

| | Bulk specific gravity | Releasing agent (melting point) |
|---|---|---|
| Example 11 | 0.24 | Example 1 (99° C.) |
| Example 12 | 0.25 | Example 3 (100° C.) |
| Comparative Example 4 | 0.22 | Comparative Example 1 (70° C.) |
| Comparative Example 5 | 0.23 | Comparative Example 2 (140° C.) |

Examples 13 and 14 and Comparative Examples 6 and 7

Four parts of the corresponding toner used in Examples 7 and 8 and Comparative Examples 2 and 3 and a carrier, F-150, were mixed and charged. The amount of charge carried by each respective mixture after a mixing and charging interval of from 1 to 60 minutes is shown in Table 3.

TABLE 3

| | Friction time (minutes) | Amount of charge ($\mu$C/g) |
|---|---|---|
| Example 13 | 1.0 | −5.6 |
| | 3.0 | −11.8 |
| | 20.0 | −30.5 |
| | 60.0 | −44.4 |
| Example 14 | 1.0 | −3.7 |
| | 3.0 | −7.9 |
| | 20.0 | −23.0 |
| | 60.0 | −35.0 |
| Comparative Example 6 | 1.0 | −0.1 |
| | 3.0 | −0.3 |
| | 20.0 | −2.3 |
| | 60.0 | −6.4 |
| Comparative Example 7 | 1.0 | −0.1 |
| | 3.0 | −0.2 |
| | 20.0 | −2.1 |
| | 60.0 | −5.0 |

Example 15

A mixture of 75 parts xylene and 3.5 parts of the releasing agent of Example 2 was heated to reflux. A mixture of 69 parts styrene, 24 parts n-butyl acrylate, 6 parts monobutyl maleate, 1.4 parts divinylbenzone and 1.0 parts di-t-butylperoxide was added dropwise to the xylene solution and polymerized for 4 hours. After removing the solvent, a resin composition having a glass transition temperature of 57° C. and a melt index of 2.1 was obtained. The releasing agent was uniformly dispersed in the composition microscopically. The anti-offsetting, fixability and releasing properties of a developer prepared by the same manner as Example 6 are shown in Table 4.

Example 16

One thousand two hundreds forty parts of a polyester resin was obtained by polycondensation of 318 parts isophthalic acid with 1,000 parts of an adduct of 3 moles propylene oxide to 1 mole Bisphenol A. The resin had a number average molecular weight of 2,500, a weight average molecular weight of 5,000, a glass transition temperature of 36° C., a melt viscosity of 50,000 poise at 75° C., an acid value of 1.0 and a hydroxyl value of 51.

A developer was prepared by mixing the resin with a releasing agent of Example 2 in the same manner as Example 6.

The anti-offsetting, fixability and releasing properties of the obtained developer are shown in Table 4.

Example 17

455 parts novolak A was placed into an autoclave, and the inlet air was flushed with nitrogen. 1.5 parts triethylamine was then added and the temperature was increased to 120° C. 261 parts propylene oxide was then supplied and reacted. The resultant propylene oxide adduct of phenolic resin was prepared by removing volatile substance. Sixty parts of the adduct, 940 parts of an adduct of 3.1 moles propylene oxide to 1 mole 2.2-bis (4-hydroxyphenyl) propane and 376 parts terephthalic acid were reacted at 230° C. in the presence of 3.5 parts dibutyl tin oxide under a stream of nitrogen. After cooling to 200° C., the reaction was continued under reduced pressure. A polyester resin having an acid value of 3.0, a glass transition temperature of 60° C. and a melting point of 118° C. was obtained.

A developer was prepared by mixing this polyester resin with the releasing agent of Example 2 in the same manner as Example 6.

The anti-offsetting, fixability and releasing properties of the obtained developer are shown in Table 4.

Example 18

950 parts of an adduct of 2.3 moles ethylene oxide to 1 mole 2,2-bis-4-hydroxyphenyl propane (hydroxyl value: 315) and 434 parts terephthalic acid were condensed at 230° C. until the acid value reached 1.5. After cooling to 190° C., 100 parts trimettilic acid was added and continued to react. A polyester resin having an acid value of 21, a glass transition temperature of 64° C. and a softening point of 143° C. was obtained.

A developer was prepared by mixing this polyester resin with the releasing agent of Example 2 in the same manner as Example 6.

The anti-offsetting, fixability and releasing properties of the obtained developer are shown in Table 4.

Comparative Example 8

A developer was prepared in the same manner as Example 6 using the polyester resin of Example 16 and Viscol 550P.

The anti-offsetting, fixability and releasing properties of the obtained developer are shown in Table 4.

TABLE 4

| | Example 15 | Example 16 | Example 17 | Example 18 | Comparative Example 8 |
|---|---|---|---|---|---|
| Offset initiating temperature (°C.) | over 220 | 220 | over 220 | over 220 | 180 |
| Minimum fixable temperature (°C.) | 140 | 152 | 139 | 167 | 155 |
| Releasing property | good | good | good | good | poor |

Having now fully described the invention, it will be apparent to one of ordinary skill in the art that many changes and modifications can be made thereto without departing from the spirit or scope of the invention as set forth herein.

What is claimed as new and desired to be secured by letters patent of the United State is:

1. A releasing agent obtained by reacting an orgainic polysiloxane comprising a hydroxyl group or an epoxy group with an ethylenically unsaturated dicarboxylic acid grafted polyolefin or with a reaction product of said grafted polyolefin and an active hydrogen atom-containing compound selected from the group consisting of an alcohol, an amine and an aminoalcohol.

2. The releasing agent according to claim 1, wherein said polyolefin is a low molecular weight polyolefin obtained by thermal degradation of a high molecular weight polyolefin.

3. The releasing agent according to claim 1, wherein said polyolefin is a polymer of ethylene.

4. The releasing agent according to claim 1, wherein said polyolefin has a number average molecular weight of 500 to 100,000.

5. The releasing agent according to claim 1, wherein said dicarboxylic acid is maleic anhydride.

6. The releasing agent according to claim 1, wherein said active hydrogen atom-containing compound is an aminoalcohol or a monohydric alcohol having 1 to 18 carbon atoms.

7. The releasing agent according to claim 1, wherein said polysiloxane has a epoxy equivalent of 200 to 10,000.

8. The releasing agent according to claim 1, wherein said reaction product of said grafted polyolefin and said alcohol is a half ester.

9. The releasing agent according to claim 1, which contains 0.1 to 5% by weight of a silicon atom, based on the total weight of said releasing agent.

10. The releasing agent according to claim 1, wherein said polysiloxane has a structure selected from one of the following formulae:

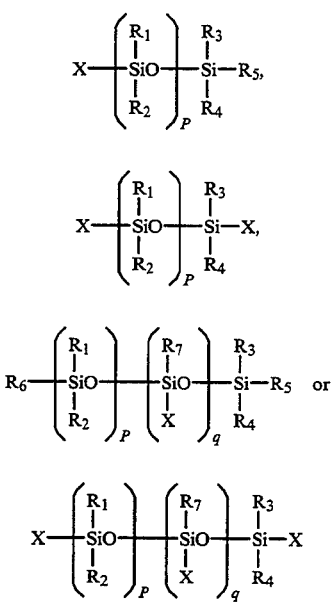

wherein each of $R_1$ to $R_7$ is independently the same or different and is a monovalent group selected from the group consisting of methyl, propyl, dodecyl, phenyl, β-phenylethyl or 3,3,3-trifluoropropyl;

X is a an epoxy group or a hydroxyl group; and

P and q are each independently 0 or an integer greater than 1, provided that the sum of P and q is an integer of from 10 to 1,000.

11. The releasing agent according to claim 10, wherein said epoxy group is selected from the group consisting of glycidyl, glycidyloxyalkyl and 3,4-oxocyclohexylalkyl.

12. The releasing agent according to claim 10, wherein said hydroxyl group is selected from the group consisting of hydroxypropyl, hydroxyisobutyl, hydroxyphenethyl, hydroxyethylpolyoxyethylenealkyl and hydroxypropylpolyoxypropylenealkyl.

13. A resin composition comprising
(i) 0.5 to 30% by weight, based on the total weight of said resin composition, of a releasing agent obtained by reacting an organic polysiloxane comprising a hydroxyl group or an epoxy group with an ethylenically unsaturated dicarboxylic acid grafted polyolefin or with a reaction product of said grafted polyolefin and an active hydrogen atom-containing compound selected from the group consisting of an alcohol, an amine and an aminoalcohol, and
(ii) 70 to 99.5% by weight, based on the total weight of said resin composition, of a binder resin.

14. The resin composition according to claim 13, wherein said binder resin is a polymer of a styrenic monomer or a polyester.

15. The resin composition according to claim 13, wherein said binder resin is a polymer of a vinyl monomer selected from the group consisting of styrenic monomers, acrylate esters, methacrylate esters, fumarate esters, acrylonitrile, methacrylic acid and methacrylamide, said polymer having a number average molecular weight of 2,000 to 15,000, a Z average molecular weight of at least 400,000 and a ratio of Z average molecular weight to number average molecular weight ranging from 50 to 600.

16. The resin composition according to claim 14, wherein said polymer of the styrenic monomer is a styrene-acrylate copolymer.

17. The resin composition according to claim 14, wherein said polyester comprises an alkylene oxide adduct of a phenolic resin and a polycarboxylic acid.

18. The resin composition according to claim 14, wherein said polyester comprises an alkylene oxide adduct of bisphenol A and a polycarboxylic acid.

19. The resin composition according to claim 15, wherein said polycarboxylic acid comprises trimetallitic acid.

20. A method of producing the resin composition according to claim 13, which comprises dissolving or dispersing said releasing agent into a solvent solution of said binder resin and removing said solvent.

21. The method according to claim 20, wherein said binder resin is a styrene-ethylenically unsaturated ester polymer.

22. A releasing agent according to claim 1, wherein said polyolefin is selected from the group consisting of polyethylene, ethylene-α-olefin copolymers, ethylene-vinyl acetate copolymers, ethylene-methacrylic acid copolymers, ethylene-acrylic acid copolymers, polypropylene, propylene-α-olefin copolymers, propylene-vinyl acetate copolymers, propylene-methacrylic acid copolymers, propylene-acrylic acid copolymers, polybutene, poly-4-methylpent-1-ene and mixtures thereof.

23. A resin composition according to claim 13, wherein said binder resin is selected from the group consisting of polyolefins, poly(vinylacetate), poly(vinylchloride), polyurethane, polyamides, poly(vinylbutyral), rosin, terpene resins, phenolic resins, petroleum resins, polymers of a vinyl monomer selected from the group consisting of styrenic monomers, acrylate esters, methacrylate esters, fumarate esters, acrylonitrile, methacrylic acid and methacrylamide, polyester resins and epoxy resins.

* * * * *